United States Patent [19]

Herbst et al.

[11] Patent Number: 4,837,396
[45] Date of Patent: Jun. 6, 1989

[54] ZEOLITE BETA CONTAINING HYDROCARBON CONVERSION CATALYST OF STABILITY

[75] Inventors: Joseph A. Herbst, Turnersvill; Yun-Yang Huang, Voorhees, both of N.J.

[73] Assignee: Mobil Oil Corporation, New York, N.Y.

[21] Appl. No.: 131,595

[22] Filed: Dec. 11, 1987

[51] Int. Cl.$^4$ ............................................. B01J 29/28
[52] U.S. Cl. ...................................... 502/67; 502/64; 502/68
[58] Field of Search .............................. 502/64, 67, 68

[56] References Cited

U.S. PATENT DOCUMENTS

| | | | |
|---|---|---|---|
| 3,072,563 | 1/1963 | Hickson | 208/120 |
| 4,060,480 | 11/1977 | Reed et al. | 208/111 |
| 4,107,088 | 8/1978 | Elliott, Jr. | 502/68 |
| 4,176,090 | 11/1979 | Vaughan et al. | 502/84 |
| 4,255,288 | 3/1981 | Cull | 252/455 Z |
| 4,259,212 | 3/1981 | Gladrow | 252/455 Z |
| 4,443,554 | 4/1984 | Chiang et al. | 502/68 |
| 4,458,023 | 7/1984 | Welsh et al. | 502/64 |
| 4,486,296 | 12/1984 | Oleck et al. | 502/67 |
| 4,542,118 | 9/1985 | Nozemack et al. | 502/64 |
| 4,568,655 | 2/1986 | Oleck et al. | 502/66 |
| 4,615,997 | 10/1986 | Chen et al. | 502/66 |

FOREIGN PATENT DOCUMENTS 82116  5/1982  Japan ..................................... 502/64

OTHER PUBLICATIONS

"Zirconium in Catalysis–its Uses and Potential", Burch, R., brochure of Magnesium Elektron, undated.
Bull. Chem. Soc. Jpn. 54, 13–19 (1981).
Bull. Chem. Soc. Jpn. 54, 3711–16 (1981).
Bull. Chem. Soc. Jpn. 57, 1283–89 (1984).

Primary Examiner—Carl F. Dees
Attorney, Agent, or Firm—Alexander J. McKillop; Charles J. Speciale; Malcolm D. Keen

[57] ABSTRACT

Hydrocarbon conversion catalysts containing zeolite beta as a catalytically active component, either on its own or with other zeolites, especially faujasites such as ultrastable zeolite Y (USY) are produced by including a metal cationic complex compound such as aluminum hydroxychloride or aluminum zirconium hydroxychloride as a stabilizing component to improve the hydrothermal stability and physical strength of the catalyst. The zeolites may be formulated into catalysts for catalytic cracking, hydrocracking, dewaxing, alkylation, isomerization, hydration and other hydrocarbon conversion processes using porous matrix materials such as silica, silica alumina or clays.

13 Claims, No Drawings

ZEOLITE BETA CONTAINING HYDROCARBON CONVERSION CATALYST OF STABILITY

FIELD OF THE INVENTION

This invention relates to a hydrocarbon conversion catalyst of improved stability and in particular, to hydrocarbon conversion catalysts containing zeolite beta which have improved stability to hydrothermal deactivation conditions.

CROSS REFERENCE TO RELATED APPLICATIONS

Co-pending application Ser. No. 131,596, filed December 11, 1987 is directed to metal-containing catalyst produced with complex metal compounds.

BACKGROUND OF THE INVENTION

Zeolite beta is a known zeolite which has been shown to possess activity for hydrocarbon conversion and which has a number of interesting and useful properties. As disclosed in U.S. Pat. No. 4,419,220 it has been found to possess activity for paraffin isomerization in the presence of aromatic components in hydrocarbon feeds such as gas oils and this property may be exploited in the production of low pour point, isoparaffinic products such as jet fuels, other middle distillates and lubricants of high viscosity index and low pour point. European Patent Publication No. 94827 discloses a process in which heavy oils are simultaneously subjected to hydrocracking and dewaxing using a catalyst based on zeolite beta which also contains a hydrogenation component; the process is able to effect a bulk conversion of the oil white, at the same time, yielding a low pour point product. The ability of zeolite beta to isomerize paraffins may also be exploited in the production of gasolines by catalytic cracking, either in fluid bed (FCC) or moving, gravitating bed (TCC) catalytic cracking processes. European Patent Publication No. 186,446 discloses a catalytic cracking process employing a mixture of zeolite beta and a faujasite cracking catalyst for the production of gasoline of improved octane and of improved low pour point distillates by catalytic cracking processes.

In spite of its interesting and useful properties, zeolite beta still presents some problems in practical utilization. One of these is its hydrothermal stability. For catalytic cracking, in particular, the zeolite cracking catalyst must withstand very severe deactivating conditions in the regenerator where the cracking catalyst is oxidatively regenerated with an oxygen-containing regeneration gas. During the regeneration process, the coke which accumulates on the catalyst is combusted to form carbon monixide and carbon dioxide together with water which is formed from the hydrogen content of the coke and from the hydrocarbons entrained with the catalyst. Under the high temperatures prevailing in the regenerator, the water is present in the form of steam and produces a severe deactivating effect on the zeolite resulting in the loss of crystallinity, activity and selectivity. Is is therefore desirable to improve the stability of zeolite beta containing hydrocarbon conversion catalysts, especially for use in catalytic cracking processes.

SUMMARY OF THE INVENTION

It has now been found that hydrocarbon conversion catalysts based on zeolite beta may be improved, particularly in their hydrothermal stability, by compositing the catalyst with a compound containing a complex metal cation, preferably a hydroxychloride complex of aluminum. In addition to possessing hydrothermal stability the catalysts also exhibit improved physical strength.

According to the present invention there is therefore provided a hydrocarbon conversion catalyst which in the uncalcined condition comprises zeolite beta and a compound containing a complex metal cation, preferably a hydroxychloride complex of aluminum. The preferred hydroxychloride complexes are aluminum hydroxychloride itself and hydroxychloride complexes of aluminum and zirconium.

In addition to zeolite beta the present hydrocarbon conversion catalysts may also contain other active components including, in particular, other zeolites, especially large pore size zeolites such as the faujasites, especially ultrastabilized Y zeolite (USY), and ZSM-20, and intermediate pore size zeolites such as ZSM-5 and ZSM-11. The catalysts are preferably made by compositing the zeolite beta together with any other zeolite components in a matrix which may be either a synthetic oxide matrix such as silica, alumina or silica-alumina or a clay matrix.

DETAILED DESCRIPTION

The present hydrocarbon conversion catalysts contain zeolite beta as an active hydrocarbon conversion component. Zeolite beta is a known zeolite and is described in U.S. Pat. No. 3,308,069 and RE 28,341 to which reference is made for a description of this zeolite, its method of preparation and its properties.

Zeolite beta may be synthesized with relatively high silica:alumina ratios, for example, in excess of 100:1 and it is possible to achieve even higher ratios by thermal treatments including steaming and acid extraction, and in this way it is possible to make highly siliceous forms of the zeolite with silica:alumina ratios ranging from the lowest ratio at which the zeolite may be synthesized up to 100:1, 1,000:1, 30,000:1 or even higher. Although these forms of the zeolite would be capable of being used in the present process, the fact that catalytic cracking requires the catalyst to possess a relatively high degree of acidity, generally implies that the more acidic materials, with silica:alumina ratios from about 15:1 to 150:1 will be preferred, with ratios from 30:1 to about 70:1 giving very good results. Because zeolite beta may be synthesized relatively easily with silica:alumina ratios of this magnitude, the zeolite may generally be used in its as-synthesized form, following calcination to remove the organic cations used in its preparation. It is generally preferred not to incorporate substantial amounts of alkali or alkaline earth metal cations into the zeolite, as disclosed in U.S. Pat. No. 4,411,770, becasue these will generally decrease the acidity of the material. If lower acidity should be desired, however, it is normally preferred to secure it by using zeolite forms of higher silicia:alumina ratio rather than by adding alkali or alkaline earth metal cations to counter the acidity, because the more highly siliceous forms of the zeolite tend to be more resistant to hydrothermal degradation. Acid extraction is a preferred method of dealuminization either on its own or with preliminary steaming; dealuminized catalysts made in this way have been found the have improved liquid product (G/D) selectivity.

The acidic functionality of the zeolite at the time that it is used as fresh catalyst in the proces, is typically in excess of about 0.1, as measured by the alpha activity test, with perferred alpha activities being in the range of from 1 to 500 or even higher, and more commonly in the range of 5 to 100. The method of determining alpha is described in U.S. Pat. No. 4,016,218 and in *J. Catalysis*, VI, 278–287 (1966), to which reference is made for a description of the method. However, the initial alpha value will be relatively rapidly degraded in a commercial catalytic cracking unit because the catalyst passes repeatedly through steam stripping legs to remove occluded hydrocarbons and in the regeneration process, a considerable amount of water vapor is released by the combustion of the hydrocarbonaceous coke which is deposited on the zeolite. Under these conditions, aluminum tends to be removed from the framework of the zeolite, decreasing its inherent acidic functionality.

Zeolite beta may be synthesized with trivalent framework atoms other than aluminum to form, for example, borosilicates, boroaluminosilicates, gallosilicates or galloaluminosilicate structural isotypes. These structural isotypes are considered to constitute forms of zeolite beta, the term zeolite beta being used in this specification to refer to materials of ordered crystalline structure possessing the characteristic X-ray diffraction of zeolite beta. The zeolite may be partially exchanged with certain cations in order to improve hydrothermal stability, including rare earths and Group IB metals.

The catalyst may also contain other catalytically active components, especially zeolites which may be either of the large pore size, intermediate pore size or small pore size. Small pore size zeolites are exemplified by zeolite A and erionite. Intermediate pore size zeolites are exemplified by zeolites ZSM-5, ZSM-11, ZSM-12, ZSM-22, ZSM-23, and ZSM-35. These zeolites are disclosed, respectively, in U.S. Pat. Nos. 3,702,886 and RE 29,949 (ZSM-5), 3,709,979 (ZSM-11), 3,832,449 (ZSM-12), 4,076,842 (ZSM-23) and 4,016,245 (ZSM-35). Large pore size zeolites are characterised by a structure which includes a twelve-membered ring system and are exemplified by the faujasite zeolites such as zeolite X, zeolite Y and the various forms of zeolite Y including rate earth Y (REY) and ultrastabilized Y (USY) and of these, ultrastabilized Y is particularly preferred because of its hydrothermal stability. USY is a known zeolite and is described, for example, in U.S. Pat. Nos. 3,293,192 and 3,449,070 to which reference is made for a disclosure of this zeolite and its method of preparation. Other large pore size zeolites which may be comprised with zeolite beta include zeolite ZSM-4, ZSM-18 and ZSM-20. These zeolites are described respectively in U.S. Pat. Nos. 3,923,639; 3,950,496 and 3,972,983, to which reference is made for a disclosure of them.

In order to improve the physical strength of the catalysts, the zeolite beta, either on its own or combined with another catalytically active ingredient as described above, is formulated with a matrix or binder in order to improve its crushing strength and attrition resistance. The zeolite will therefore generally be incorporated in a clay or other matrix material such as a synthetic metal oxide, especially silica, alumina, silica-alumina, magnesia or a combination of such oxides. Other metal oxides such as silica-magnesia, silica-zirconia, silica-thoria, silica-beryllia, silica-titania or ternary compositions such as silica-alumina-thoria, silica-alumina-zirconia, silica-alumina-magnesia and silia-magnesia-zirconia may also be used. Certain clays may also be used as binder materials, especially acid-treated clays which have superior activity. The zeolite beta together with any other catalytically active zeolite may be composited with the binder material in a conventional manner to produce the final matrixed catalyst. If a synthetic metal oxide such as alumina or silica or silica-alumina is used as the matrix, the zeolite component may be co-gelled with the matrix components or alternatively, a pre-formed zeolite may be added to a gel of the matrix prior to drying. Clays may suitably be composited with the zeolite component by slurrying the zeolite with the clay, followed by homogenisation of the slurry and spray drying of the mixture to produce the final matrixed catalyst. Naturally occurring clays which can be composited with the modified zeolite include those of the montmorillonite and kaolin families, which families include the sub-bentonites and the kaolins or others in which the main mineral constituent is halloysite, kaolinite, dickite, nacrite or anauxite. Such clays can be used in the raw state as originally mined or initially subjected to calcination, acid treatment or chemical modification.

The relative proportions of zeolite and inorganic matrix may vary widely with the zeolite content ranging from between about 1 to about 99 percent by weight and more usually in the range of about 5 to about 80 percent by weight of the composite.

The dried catalyst may be subjected to various activation treatments including ion exchange, e.g., to reduce sodium content or to introduce other desired cationic species such as rare earths and generally, ammonium exchange will be employed to bring the zeolite component or components into their more active hydrogen forms. Calcination will normally precede any cation exchange treatment in order to remove organic directing agents used in the synthesis of the zeolite.

The catalysts according to the present invention are made with a compound containing a complex metal cation. The complex compound is added to the zeolite and any matrix material which is used in order to from the finished catalyst. Thus, in the uncalcined state the catalysts contain the zeolite beta together with any other catalytic components, the matrix material (if used) and the complex metal compound. On calcination, the complex compound will usually be converted to some other form, usually the oxide, which will be dispersed through the catalyst and which will produce the desired stabilising effect.

The complex compound may contain various metals as complex cations including, for example, metals of Groups IIIA, IIIB, IVA or VA of the Periodic Table (IUPAC Table as shown, for example, by Fisher Scientific Company Cat. No. 5-702-10), specifically, rare earths such as lanthanum or cerium, titanium, zirconium, haffnium, aluminum and uranium. Of these metals, aluminum and zirconium are preferred. More than one metal may be present in the complex compounds, for example, aluminum and zirconium.

The complex cations contain various ligands in addition to the metal or metals and the ligands may be organic or inorganic in nature, for example, hydrozylato, oxalato or halo inorganic ligands or organic ligands such as glycine. The reaction product of aluminum zirconium hydroxychloride with glycine, is preferably in equimolecular proportions.

The amount of the complex compound is generally from 1 to 25, preferably 2 to 10, weight percent of the zeolite content of the catalyst.

The preferred complex compounds contain aluminum in the complex cation together with hydroxyl and chloride ligands to balance the charge on the aluminum. Metals other than aluminum may also be present, especially zirconium, together with anionic species to balance the net charge on the metals. A suitable and preferred hydroxy chloride complex is aluminum hydroxy chloride $[Al_2(OH)_5Cl]_x$ and a suitable mixed metal complex is aluminum zirconium hydroxy chloride $Al_3Zr(OH)_9Cl_4$ which is preferably used in the form of a reaction product of the mixed metal complex with organic complexing agents such as glycine.

Suitable zirconium complex cation compounds may include zirconyl compounds with the $ZrO^{2+}$ cation and specific compounds such as zirconyl acetate $Zr(OH)_2 \cdot (CH_3CO_2)_2$, zirconium ammonium salts $Zr(NH_3)_4X_{6/n}$ where X is an anion of valency n especially halogen such as F or Cl, zirconyl carbonate $ZrOCO_3 \cdot xH_2O$, zirconium glycolate $H_2ZrO((C_2H_2O_3)_3$, zirconium lactate $H_4ZrP(CH_3CHOHCO_2)_3$, zirconium oxychloride $ZrOCL_2 \cdot 8H_2O$ (zirconyl chloride), zirconium phosphate $ZrO(H_2PO_4)_2 \cdot 3H_2O$, zirconyl sulfate $ZrO(H_2PO_4)_2(SO_4)_2 \cdot xH_2O$, zirconium tetracetylacetonate $Zr[OC \cdot CH_3: CHCOCH_3]_4$, zirconyl hydroxychloride $ZrO(OHCl) \cdot nH_2O$, zirconyl nitrate $ZrO(OH)NO_3$, zirconium hydroxychloride. The zirconium-aluminum complex compounds described above i.e. zirconium aluminum hydroxychloride $Al_3ZR(OH)_9Cl_4$ and the reaction product of equimolar proportions of zirconium aluminum hydroxychloride with glycine are preferred zirconium-containing compounds.

The stabilizing component may be mixed with the zeolite component of the catalyst and any binders at any suitable stage in the manufacture of the catalyst, for example, by slurrying with the zeolite and binder prior to homogenization and drying. Alternatively, the stabilizer could be added to a gel of the binder containing added zeolite. The normal treatments carried out after drying of the catalyst such as calcination followed by ammonium and other cation exchange may take place in the normal way. As described above, the complex cations may be converted to different compounds of the stabilising metal during the calcination step but the effect of this inclusion of the complex compound persists after the calcination and into the use of the catalyst.

The catalysts containing the aluminum hydroxychloride complexes exhibit improved physical strength together with improved hydrothermal stability and in addition, exhibit higher activity in catalytic cracking operations. It has been observed that the octane number of gasoline produced by catalytic cracking using the present stabilized catalysts may be higher than that of cracked gasolines produced by conventional catalyst compositing techniques. The improved resistance to hydrothermal deactivation is also a value in other processes, especially a hydroprocessing applications such as hydrocracking, isomerization, dewaxing, alkylation, hydration and the like.

EXAMPLE 1

A zeolite beta catalyst containing 25% zeolite beta in a matrix of 25% alumina/50% clay and containing aluminum hydroxy chloride $[Al_2(OH)_5Cl]_x$ was prepared by mixing the aluminum hydroxychloride with clay and zeolite beta to form a slurry which was then homogenized and spray dried. After spray drying the catalyst was mildly calcined at 1000° F. (540° C.) for one hour and subsequently ammonium and rare earth exchanged. This catalyst is referred to below as Catalyst A.

A comparable zeolite beta catalyst containing 25 wt.% zeolite beta in a matrix of 45.3% silica/3.4% alumina/26.3% clay was prepared by the conventional hydrogel technique in which the zeolite and the clay are dispersed in a hydrogel of the silica and alumina matrix components after which the mixture is homogenized and spray died. After spray drying the catalyst was ammonium and rare earth exchanged to form a catalyst referred to as Catalyst B.

Both catalysts were steam deactivated (10 hours, 1450° F. (790° C.), 45% steam, 55% air atmospheric pressure), and then evaluated it for their cracking activity in a fixed fluidized bed reactor at 960° F. (515° C.) using a sour heavy gas oil feed.

The properties of the two catalysts are set out in Table 1 below and Table 2 shows the results achieved from the cracking experiment. As shown in Table 2, Catalyst A showed a higher activity and higher gasoline octane number than did Catalyst B, indicating that the former has a greater hydrothermal stability. The physical properties of the catalyst show that the overall physical properties of Catalyst A are superior to those of Catalyst B although the mild calcination may have contributed partly to the low attrition index for Catalyst A; it is doubtful that a similar treatment would have resulted in a low attrition index for Catalyst B.

TABLE 1

| Properties of Zeolite Beta Catalysts | | |
|---|---|---|
| | Catalyst A | Catalyst B |
| Attrition Index (Fresh sample) | 4 | 43 |
| Pore Volume, cc/g | 0.39 | 0.36 |
| Packed Density, g/cc | 0.72 | 0.65 |

TABLE 2

| Catalytic Cracking on Zeolite Beta FCC Catalysts | | |
|---|---|---|
| Catalyst | A | B |
| Treatment | | |
| Hours | 10.0 | 10.0 |
| Temperature, Deg. F. | 1450 | 1450 |
| % Steam | 45 | 45 |
| Cat/Oil | 5.00 | 5.00 |
| WHSV | 12.00 | 12.00 |
| Reaction Temperature, Deg. F. | 956 | 954 |
| Conversion, % wt. | 59.3 | 37.9 |
| Conversion, % vol. | 61.2 | 39.6 |
| C5+ Gasoline, % vol. | 38.1 | 29.9 |
| C5+ Gasoline, % wt. | 31.4 | 24.0 |
| Total C4, % vol. | 17.9 | 9.4 |
| Dry Gas, % wt. | 10.0 | 5.8 |
| Coke, % wt. | 6.48 | 2.03 |
| C-On-Cat, Final, % wt. | 1.10 | 0.35 |
| N-C5, % vol. | 0.4 | 0.2 |
| 1-C5, % vol. | 2.0 | 0.9 |
| C5=, % vol. | 5.6 | 3.3 |
| N-C4, % vol. | 1.3 | 0.6 |
| N-C4, % wt. | 0.8 | 0.4 |
| I-C4, % vol. | 5.4 | 2.4 |
| I-C4, % wt. | 3.3 | 1.4 |
| C4=, % vol. | 11.1 | 6.4 |
| C4=, % wt. | 7.3 | 4.2 |
| C3, % vol. | 2.5 | 1.2 |
| C3, % wt. | 1.4 | 0.7 |
| C3=, % vol. | 9.7 | 5.5 |
| C3=, % wt. | 5.5 | 3.1 |
| C2, % wt. | 0.8 | 0.5 |
| C2=, % wt. | 0.5 | 0.4 |
| C1, % wt. | 0.8 | 0.4 |
| H2, % wt. | 0.13 | 0.07 |
| H2S, % wt. | 0.97 | 0.62 |

TABLE 2-continued

| Catalytic Cracking on Zeolite Beta FCC Catalysts | | |
|---|---|---|
| Catalyst | A | B |
| Hydrogen Factor | 69 | 58 |
| Recovery, % wt. | 94.0 | 95.6 |
| Alkylate, % vol. | 34.8 | 19.9 |
| C5+ Gasoline + Alkylate, % vol. | 72.8 | 49.0 |
| Outside 1-C4, % vol. | 18.0 | 11.1 |
| RON + O, Raw Gasoline | 93.3 | 91.5 |
| MON + O, Raw Gasoline | 0.0 | 0.0 |
| RON + O, C5+ Gasoline | 92.8 | 91.0 |
| RON + O, C5+ Gasoline + Alkylate | 93.5 | 92.3 |
| LFO, % wt. | 33.0 | 40.9 |
| HFO, % wt. | 7.7 | 21.2 |
| G + D, % wt. | 64.3 | 64.9 |

EXAMPLE 2

Zeolite beta (75 g) was slurried with 1500 ml deionised water and 50 g aluminum chlorhydrate and charged to an autoclave and stirred for 30 min. The mixture was then heated to 180° F. (82° C.) and held for two hours at this temperature. The mixture was discharged from the autoclave and the catalyst recovered by filtration, washing with water and drying. The resulting catalyst was identified as Catalyst C.

In a similar manner, zeolite beta (100 g) was slurried with 1500 ml deionized water and 25 g aluminum chlorhydrate and the mixture held at 160° F. (71° C.) for one hour in an autoclave. The resulting catalyst is identified as Catalyst D.

Another catalyst was prepared by slurrying zeolite beta (100 g) with 20 g $MgCl_2$ in 1200 milliliters deionized water followed by mixing for one hour after which 25 g aluminum chlorhydrate was added. The mixture was then held at 160° F. (71° C.) for two hours in an autoclave. The resulting catalyst was identified as Catalyst E.

Zeolite beta (200 g) was slurried in 1200 ml. water and 200 g of mixed rare earth (lanthanum/cerium) chlorides added as a 60% wt./wt. solution $RECl_3 6H_2O$. The mixture was held at 180° F. (82° C.) for two hours in an autoclave before formulating into catalyst. The finished catalyst was designated Catalyst F.

In a similar manner, the following catalysts were prepared using the described materials and slurrying them in water as described above:

(Catalyst G): Zeolite beta (507 g), $RECl_3$ solution (50 g), aluminum chlorhydrate (50 g), 180° F. two hours.

(Catalyst H): Zeolite beta (75 g), 20% $TiCl_3$ solution (20 g), aluminum chlorhydrate (50 g), room temperature one hour.

(Catalyst I): Zeolite beta (50 g) $TiCl_3$ (50 g), room temperature.

(Catalyst J): Zeolite beta (30 g) $ZrOCl_2 \cdot 8H_2O$ (20 g), room temperature (ion exchange reaction).

(Catalyst K): Zeolite beta (80 g) $MgCl_2$ (16 g), room temperature, one hour.

(Catalyst L): Zeolite beta (150 g), zirconium aluminum chlorhydrate/glycerine complex (500 g), 180° F. two hours.

(Catalyst M): Zeolite beta (250 g), aluminum chlorhydrate (100 g), 260° F. 20 hours.

(Catalyst N): Zeolite beta (150 g), $UO_2NO_3 2 \cdot 6H_2O$ (50 g) 180° F., 1 hour (ion exchange).

(Catalyst O): Zeolite beta (100 g), aluminum chlorhydrate (50 g), 160° F. 20 hours.

The initial alpha values (after calcination) of Catalysts C-O are given in Table 3 below together with the alpha values of these catalysts before and after steaming. Two steaming treatments were used as follows:

Treatment S - 1000° F. (450° C.), 2 hour, 0 psig (100 kPa abs.)

Treatment $S_1$ - 1200° F. (650° C.), 4 hours, 0 psig (100 kPa abs.)

Table 3 also shows the surface areas of the catalyst before and after these treatments.

TABLE 3

| | Catalyst Hydrothermal Stability | | | | | |
|---|---|---|---|---|---|---|
| | Surface Area $m^2 \cdot g^{-1}$ | | | Alpha | | |
| Catalyst | Calcined | Steamed (S) | Steamed ($S_1$) | Calcined | Steamed (S) | Steamed ($S_1$) |
| C | 508 | 458 | 404 | 261 | 91 | 13 |
| D | 556 | 487 | — | 301 | 19 | 8 |
| E | 553 | 472 | 421 | 267 | 125 | 11 |
| F | 603 | — | — | 213 | 85 | 3 |
| G | 540 | 482 | 426 | 338 | 104 | 14 |
| H | 589 | 522 | — | 285 | 91 | 7 |
| I | 575 | — | — | 227 | 66 | 5 |
| J | 563 | — | — | 96 | 54 | 4 |
| K | — | — | — | 97 | — | — |
| L | 585 | — | 464 | 242 | — | 23 |
| M | 521 | — | — | 307 | 86 | 12 |
| N | 620 | — | — | 361 | 96 | 8 |
| O | — | — | — | 322 | 88 | 13 |

EXAMPLE 5

A fluid cracking catalyst was prepared in which 15% wt% of zeolite beta and 10 wt.% of ultrastable Y, (USY) were supported on a silica-alumina-clay matrix. A zeolite slurry was prepared by mixing 800 g. of Kaopaque (trade mark) clay (87.32% solids) first with 3387 g. of aluminum chlorhydrate (24% $Al_2O_3$) for 15 minutes and then with 3110 g. of ball-milled (25.72% solids) and 1964.3 g. of ball-milled USY (27.15% solids) for 30 minutes. In a separate vessel, a matrix slurry was prepared by mixing 750 g. of Kaopaque (trade mark) clay with 28,760 g. of water and 6038 g. of sodium silicate solution, (Q-brand (trade mark), 28.9% $SiO_2$), neutralizing with 574 g. of concentrate sulfuric acid (96.3% $H_2SO_4$), mixing with 770 g. of aluminum sulfatre solution (20% $Al_2O_3$ over a period of 30 minutes, adjusting the pH to 4.3, and mixing for additional 30 minutes. The zeolite slurry was blended with the matrix slurry and stirred for 30 minutes. The mixture was filtered, reslurried with water to contain 10.1% solids, homogenized and spray-dried. The catalyst was further exchanged with ammonium nitrate solution and then with rare-earths chloride solution, and finally dried at 250° F. (121° C.). Before FCC evaluation, the catalyst was steam-deactivated at 1450° F. (790° C.) for 10 hours in an atmosphere of 45% steam and 55% air to simulate catalyst aging in a commercial FCC unit. This catalyst is designated as Catalyst P.

For comparison, a fluid catalyst containing 25% zeolite beta alone in a similar matrix was prepared, and is designated as Catalyst Q. Two catalysts that contain USY only, one in an $Al_2O_3$/clay matrix and the other in $SiO_2/Al_2O_3$/clay matrix, are also available for comparison. They are designated as Catalyst R and Catalyst S, respectively. The chemical and physical properties of these catalysts are shown in Table 4 below.

TABLE 4

Chemical Composition and Physical Properties of FCC Catalysts

| Catalyst | P | Q | R | S |
|---|---|---|---|---|
| Zeolite, wt. % | | | | |
| Beta | 15 | 25 | 0 | 0 |
| USY | 10 | 0 | 25 | 20 |
| Matrix, wt. % | | | | |
| $SiO_2$ | 32.6 | 32.6 | 0 | 48.3 |
| $Al_2O_3$ | 17.4 | 17.4 | 25 | 3.7 |
| Clay | 25 | 25 | 50 | 28 |
| Physical Properties | | | | |
| Surface Area, m²/g | 144 | 124 | 159 | 109 |
| Pore Volume, cc/g | 0.31 | 0.25 | 0.24 | 0.20 |
| Packed Density, g/cc | 0.75 | 0.81 | 0.78 | 0.88 |
| Attrition Index | 16 | 24 | 5 | — |

The cracking activity of these catalysts was evaluated in a fixed-fluidized bed reactor at 960° F. using sour heavy gas oil (SHGO) with 1.0 minute on-stream. The properties of the chargestock are shown in Table 5. The activity is compared at a constant catalyst-to-oil ratio of 4, as shown in Table 6, while the product selectivity is compared at a constant conversion of 65 vol%, as shown in Table 7.

TABLE 5

Charge Stock Properties of Sour Heavy Gas Oil

| API Gravity | 21.9 |
|---|---|
| Specific Gravity, 60° F. (15° C.) | 0.9246 |
| Pour Point, °F. (°C.) | 95 (35) |
| KV @ 40° C., cs | 37.01 |
| KV @ 100° C., cs | 5.422 |
| Refractive Index, 70° C. | 1.4935 |
| Aniline Number | 159.0 |
| Bromine Number | 3.9 |
| CCR, wt % | 0.29 |
| Sulfur, wt % | 2.37 |
| Hydrogen, wt % | 12.50 |
| Nitrogen, Total, ppmw | 700 |
| Nitrogen, Basic, ppmw | 341 |
| Molecular Weight | 343 |
| Nickel, ppm | 0.18 |
| Vanadium, ppm | 0.65 |
| Iron, ppm | 4.1 |
| Copper, ppm | 0.10 |
| Distillation (D1160) °F. | |
| IBP | 471 |
| 5% vol. | 592 |
| 10% | 647 |
| 20% | 699 |
| 30% | 733 |
| 40% | 766 |
| 50% | 798 |
| 60% | 827 |
| 70% | 862 |
| 80% | 901 |
| 90% | 947 |
| 95 | 986 |
| Composition, wt % | |

TABLE 5-continued

Charge Stock Properties of Sour Heavy Gas Oil

| Paraffins | 19.9 |
|---|---|
| Naphthenes | 27.0 |
| Aromatics | 53.2 |

TABLE 6

Cracking Activity, Constant Cat/Oil

| Catalyst | P | Q | R | S |
|---|---|---|---|---|
| Catalyst/Oil, wt/wt | 4 | 4 | 4 | 4 |
| Conversion, vol. % | 65.1 | 50.6 | 71.8 | 59.6 |
| C5+ Gasoline, vol. % | 47.7 | 37.2 | 56.4 | 50.3 |
| Total C4's, vol. % | 16.2 | 12.8 | 15.6 | 12.5 |
| Dry Gas, wt % | 9.7 | 7.0 | 9.1 | 6.3 |
| Coke, wt % | 3.5 | 2.5 | 4.8 | 2.2 |
| RON + 0, C5+ Gasoline | 91.1 | 92.5 | 90.3 | 89.7 |
| G + D, vol % | 77.4 | 73.2 | 82.0 | 80.2 |
| G + D + A, vol % | 109.2 | 100.1 | 107.4 | 102.8 |

TABLE 7

Estimated Product Distribution 65% Constant Conversion

| Catalyst | P | Q | R | S |
|---|---|---|---|---|
| Conversion, vol. % | 65 | 65 | 65 | 65 |
| C5+ Gasoline, vol. % | 47.7 | 39.9 | 52.2 | 47.2 |
| Total C4's, vol. % | 16.7 | 20.4 | 14.6 | 14.9 |
| Dry Gas, wt. % | 9.5 | 12.2 | 7.4 | 7.9 |
| Coke, wt. % | 3.5 | 4.0 | 3.5 | 2.8 |
| RON + O, C5+ Gasoline | 91.4 | 92.9 | 90.3 | 89.5 |
| G + D, vol. % | 77.3 | 69.1 | 82.9 | 74.8 |
| G + D + A, vol. % | 109.0 | 111.1 | 107.7 | 102.0 |

The results indicate that Catalyst P has an activity equivalent to the USY alone catalysts (R and S), but much greater than the zeolite beta alone catalyst (Q). Higher gasoline octane quality and higher total liquid (G+D+A) yield are observed for Catalyst P, compared to Catalyst R and Catalyst S. A catalyst with 25% USY alone in a similar matrix as Catalyst P is expected to have a cracking activity and product selectivity between those of Catalyst R and Catalyst S. However, the zeolite beta/USY composite catalyst prepared by the disclosed method is expected to have a better overall FCC performance.

We claim:

1. A method of improving the hydrothermal stability of a zeolite beta hydrocarbon conversion catalyst which method comprises compositing zeolite beta with a stabilizing compound which comprises a hydroxychloride of aluminum.

2. A method according to claim 1 in which the stabilizing compound comprises aluminum hydroxychloride.

3. A method according to claim 1 in which the stabilizing compound comprises aluminum zirconium hydroxychloride or glycine aluminum zirconium hydroxychloride.

4. A method according to claim 1 in which the stabilizing compound comprises aluminum hydroxychloride of the formula $[Al_2(OH)_5Cl]_x$.

5. A method according to claim 1 in which the stabilizing compound comprises aluminum zirconium hydroxychloride of the formula: $Al_3Zr(OH)_9Cl_4$.

6. A method according to claim 1 in which a porous matrix material is composited with the zeolite beta and the stabilizing compound.

7. A method according to claim 6 in which the porous matrix material is composited with the zeolite and the stabilizing compound and the composite so produced is calcined.

8. A method according to claim 1 in which a second zeolite having cracking activity is composited with the zeolite beta and the stabilizing compound.

9. A method according to claim 8 in which the second zeolite is a large pore size zeolite.

10. A method according to claim 8 in which the large pore size zeolite is zeolite Y.

11. A method according to claim 8 in which the large pore size zeolite is ZSM-20.

12. A method according to claim 8 in which the second zeolite is an intermediate pore size zeolite.

13. A method according to claim 8 in which the zeolite beta, the second zeolite and the stabilizing compound are composited with a matrix material comprising a synthetic metal oxide or oxides, a clay or a mixture of a synthetic metal oxide or oxides and a clay.

* * * * *